United States Patent Office 3,422,721
Patented Jan. 21, 1969

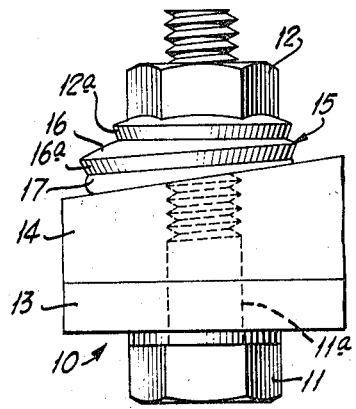
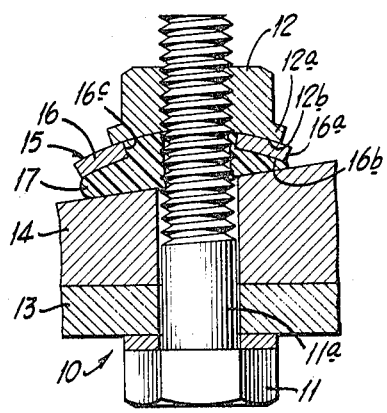
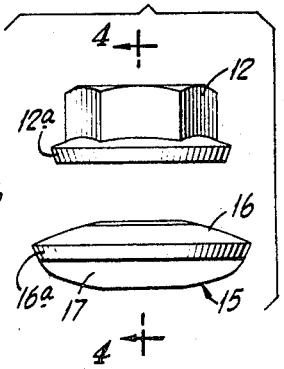
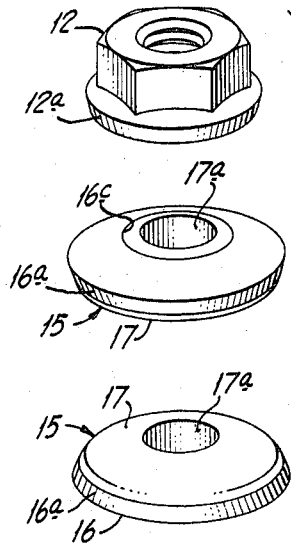
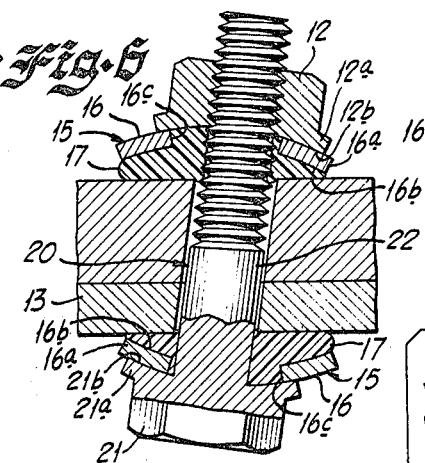
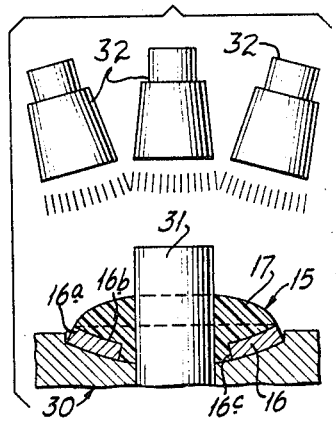
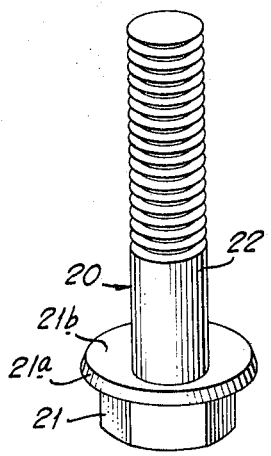
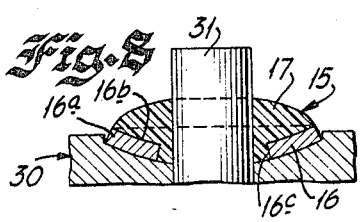
INVENTOR
JOHN L. YONKERS
by Mason, Kolehmainen,
Rathburn and Wyss
ATTORNEYS.

3,422,721
SELF-ALIGNING AND SEALING MEMBER
John L. Yonkers, 2030 Sunset Ridge Road,
Northbrook, Ill. 60062
Filed Aug. 22, 1966, Ser. No. 573,944
U.S. Cl. 85—1          1 Claim
Int. Cl. F16b 39/24

ABSTRACT OF THE DISCLOSURE

There is provided a self-aligning and sealing member for use with a fastener such as a bolt or nut. The member comprises an arcuate washer having a ring-shaped plastic filler joined to the concave side thereof which defines a generally convex arcuate outer surface.

---

This invention relates to a self-aligning and sealing member, and to a method of making the same; and more particularly, to a washer-like member which will provide self-aligning and sealing of a bolt, nut or similar fastening device.

Heretofore difficulty has been experienced in obtaining a flat seating and sealing of bolts and nuts through such materials as corrugated sheet, or where material has been field drilled with slight misalignment of the hand-held drill. Heretofore it has been known to provide nuts, bolts and similar fastening devices with a plastic filler or sealer deposited on the head surface of the nut or bolt to provide for sealing of the nut or bolt with the fastened members. Such deposit of sealer has not been entirely satisfactory when the bolt or nut was subjected to slight misalignments, and moreover the depositing of the sealing material on the nut and bolt generally required considerable handling and shipping of the nut or bolt for the further addition of the filller material.

Accordingly, it is an object of the present invention to provide a new and improved self-aligning and sealing member.

A further object of the present invention is to provide a new and improved self-aligning and sealing washer for use with nuts, bolts and like fasteners.

Yet a further object of the present invention is the provision of a self-aligning and sealing nut or bolt assembly which will accommodate misalignment between the fastening device and the seating surfaces and at the same time assure a good hermetic seal between the fastener and the fastened members.

Yet a further object of the present invention is to provide a new and improved method of making a self-aligning, locking, and sealing member.

Further objects and advantages of the present invention will become apparent as the following description proceeds and the features of novelty which characterize the invention will be pointed out with particularity in the claims annexed to and forming a part of this specification.

In accordance with these and other objects, there is provided an improved self-aligning and sealing member for use with a fastener such as a bolt or a nut which has been provided with a cooperating arcuate surface. In accordance with the present invention the member comprises an arcuate washer engageable with the arcuate surface of the fastener, and a ring-shaped plastic filler is joined to the washer for seating against the fastened members. Advantageously it has been found that a self-aligning and sealing member according to the present invention will accommodate misalignment of the component parts, such as where the bolt hole has been field drilled crookedly through the members, or where self-tapping screws are used; and at the same time the self-aligning and sealing member will provide a good hermetic seal between the fastener and the fastened members.

Moreover, it has been found that some plastic filler will flow on the reverse side of the washer, holding the washer centered and providing a lock-type fastening.

The present invention is also related to an improved method of making a self-aligning and sealing member. In accordance with the present invention a spherical washer is positioned on a Teflon mandrel and the plastic filler is deposited onto the concave surface of the washer. Some of the plastic filler material will run on the opposite side of the washer. Thereafter the plastic filler material is cured as required. Advantageously the convex side of the washer may be first coated with a silicon grease or silicon release agent to provide for removal of the completed member from the holding fixture. Moreover advantageously the filler material may be squirted from a gun as the washer is rotated about the mandrel axis.

For a better understanding of the present invention, reference may be had to the accompanying drawing wherein:

FIG. 1 is a fragmentary view of members secured together with a fastener device according to the present invention;

FIG. 2 is a cross sectional view of fastened members of FIG. 1 secured together with the improved self-aligning fastener device according to the present invention and illustrating misalignment between the fastener and the surface of the members;

FIG. 3 is an exploded side view of a self-aligning and sealing member in combination with a nut;

FIG. 4 is a cross sectional view of the self-aligning and sealing member and nut of FIG. 3, taken along line 4—4 of FIG. 3;

FIG. 5 is a cross sectional view of members fastened together with a modified bolt and nut employing a self-aligning and sealing member under both the head of the bolt and the nut;

FIG. 6 is an exploded perspective view of the bolt and nut of FIG. 5;

FIG. 7 illustrates one step in the method of manufacture of the self-aligning and sealing member according to the present invention;

FIG. 8 illustrates a second step in the method of making the self-aligning and sealing member; and FIG. 9 illustrates yet another step in the method of making the self-aligning and sealing member according to the present invention.

Referring now to the drawings, and particularly to the embodiment of FIGS. 1 through 4, there is illustrated a fastener 10, here shown as a bolt 11 and nut 12, securing together two plates 13, 14. The bolt 11 is of conventional design, while the nut 12 is of a modified design to accommodate a self-aligning and sealing member 15 according to the present invention.

The nut 12 is provided with a slightly enlarged washer-like skirt 12a having an arcuate lower surface 12b here shown spherical in shape. The self-aligning and sealing member 15 includes an arcuate washer 16 having a convex upper arcuate surface 16a, spherical in shape, and a lower concave surface 16b also spherical in shape. A ring-shaped plastic filler 17 is joined to the concave lower surface of the washer 16. Any curable resilient material may be employed for the filler 17, but it has been found that polyvinyl chloride performs satisfactorily. The filler 17, as best illustrated in FIGS. 3 and 4, projects some distance below the surface 16b of the washer 16. Both the washer 16 and the filler 17 are provided with aligned openings 16c and 17a for receiving a stem portion 11a of the bolt 11. Preferably the opening 16c in the washer 16 is somewhat larger than the diameter of the stem 11a to provide for rocking alignment of the self-aligning and sealing member 15 against the surface 12b of the nut 12, and the material of the filler 17 extends into the opening of the washer 16, some of the filler material flowing in a thin layer onto the opposite or convex surface of the washer 16.

FIG. 5 illustrates a bolt and nut arrangement employing a self-aligning and sealing member under both the head of the bolt and the nut. More specifically, there is illustrated a bolt 20 having a head 21 and a stem 22. The head 21 of the bolt 20 includes a washer-like skirt 21a having an inner arcuate or spherical surface 21b to receive the self-aligning and sealing member 15. A second self-aligning and sealing member 15 is also received against the nut 12, which may be identical to that described in the embodiment of FIGS. 1 through 4. The embodiment of FIG. 5 provides for misalignment between the bolt hole and both the surfaces engaged by the bolt head 21 and the nut 12.

Advantageously, it can be seen that the self-aligning and sealing member 15 will rock or slide with reference to the attaching fastener, and the filler 17 thereof will be compressed against the surface of the joining member even though there may be misalignment between the bolt hole and the surface thereof. At the same time the self-aligning and sealing member 15 will provide a hermetic seal between the bolt, bolt hole and the surface of the joined member.

It has been found that a 3/4 inch spherical radius on the surface 12b of the nut 12 and the surface 16a of the washer 16 for a 5/16 inch bolt will perform satisfactorily. Moreover, it has been found that the opening 16c of the washer 16 if 1/8 inch larger than the diameter of the stem of the bolt will also perform satisfactorily. Accordingly, a 5/16 inch bolt would have a 7/16 inch opening 16c in the washer 16. It will be understood, of course, that the opening 17a in the filler 17 will be a slide fit onto the stem of the bolt, unless it is desired to make a tighter fit so that the washer will be held preassembled with the bolt.

FIGS. 7, 8 and 9 illustrate a method of making a self-aligning and sealing member according to the present invention. As therein illustrated, the arcuate washer 16 is placed in a fixture 31 with the concave side thereof extending upwardly and spaced over a Teflon stud or mandrel 31. Preferably the underside of the washer 16a has been sprayed or otherwise coated with a silicon lubricant or release agent to provide for its removal from the fixture 30. Thereafter plastic filler 17 is deposited on top of the washer 16. Since, as heretofore described, the opening 16c in the washer 16 is somewhat larger than the diameter of the stud 31, the filler material will flow between the stud and the edge 16c of the washer 16, as best illustrated in FIG. 6. Some of the filler material may form a thin film on the underside or convex side of the washer 16. Advantageously the plastic filler 17 may be squirted from a gun while the fixture 30 and mandrel 31 are rotated. Thereafter the plastic filler material 17 is cured as required, for example in the case of polyvinyl chloride, by subjecting the filler to exposure of heat lamps 32, FIG. 9.

As indicated above, the Teflon stud 31 may be fluted if desired so that the vinyl would flow in around the flutes and the vinyl would be strong enough to hold the self-aligning and sealing member preassembled to the stem of the bolt for fast assembly.

Although the present invention has been described by reference to a single embodiment thereof, it will be apparent that numerous other modifications and embodiments may be devised by those skilled in the art and it is intended by the appended claims to cover all modifications and embodiments which will fall within the true spirit and scope of the present invention.

What is claimed as new and desired to be secured by Letters Patent of the United States is:

1. A self-aligning and sealing member in combination with a fastener provided with an engaging concave arcuate clamping surface generally spherical in shape, said member comprising an annular metallic washer having a central opening therein and being dished to define generally spherical convex and concave sides thereon, said convex side of said washer being complementary to and engaging the concave arcuate surface on said fastener, and a ring-shaped synthetic plastic filler secured to said concave side of said washer defining a generally convex spherical outer surface adapted to engage a workpiece to form a seal about an opening therein.

References Cited

UNITED STATES PATENTS

| 1,356,404 | 10/1920 | Robinson | 85—1 |
| 2,761,349 | 9/1956 | Heller | 151—7 |
| 2,851,079 | 9/1958 | Heller | 151—7 |
| 3,202,033 | 8/1965 | Weidner | 85—1 |
| 3,220,289 | 11/1965 | Farekas | 85—50 |
| 3,286,577 | 11/1966 | Weidner | 85—1 |

CARL W. TOMLIN, *Primary Examiner.*

RAMON S. BRITTS, *Assistant Examiner.*

U.S. Cl. X.R.

85—50; 117—132